(12) United States Patent
Quilling et al.

(10) Patent No.: US 6,424,611 B1
(45) Date of Patent: Jul. 23, 2002

(54) UNIVERSAL OPTICAL DISK AUTOMATED CLEANER-INSPECTOR

(75) Inventors: Brenda Gail Quilling, 179A Hunns Lake Rd., Stanfordville, NY (US) 12581; Jeffrey Scott Hamelink, Shakopee, MN (US)

(73) Assignee: Brenda Gail Quilling, Stanfordville, NY (US)

( * ) Notice: Subject to any disclaimer, the term of this patent is extended or adjusted under 35 U.S.C. 154(b) by 0 days.

(21) Appl. No.: 09/459,822

(22) Filed: Dec. 13, 1999

(51) Int. Cl.[7] ................................................. G11B 3/58
(52) U.S. Cl. ........................................................ 369/72
(58) Field of Search ........................... 369/72, 74, 77.2; 360/128, 137; 15/88.3; 134/6

(56) References Cited

U.S. PATENT DOCUMENTS

| | | | | |
|---|---|---|---|---|
| 5,146,382 A | * | 9/1992 | Yao-Ko | 360/137 |
| 5,161,146 A | | 11/1992 | Chaya et al. | 369/72 |
| 5,373,409 A | * | 12/1994 | Wu | 360/128 |
| 5,467,332 A | | 11/1995 | Tsurushima | 369/72 |
| 5,488,596 A | * | 1/1996 | Martin | 360/128 |
| 5,524,313 A | * | 6/1996 | Sato | 15/88.3 |
| 5,963,526 A | | 10/1999 | Lee | 369/72 |
| 5,989,355 A | * | 11/1999 | Brandt et al. | 134/6 |
| 6,028,830 A | * | 2/2000 | Fritsch et al. | 369/71 |
| 6,041,465 A | * | 3/2000 | Yashiki et al. | 15/88.3 |
| 6,154,431 A | * | 11/2000 | Arai et al. | 369/77.2 |
| 6,188,545 B1 | * | 2/2001 | Nguyen et al. | 360/128 |

FOREIGN PATENT DOCUMENTS

| | | | |
|---|---|---|---|
| JP | 54-145117 | * | 11/1979 |
| WO | WO-98/53455 | * | 11/1998 |

* cited by examiner

*Primary Examiner*—Brian E. Miller
*Assistant Examiner*—Tianjie Chen

(57) ABSTRACT

An optical disk cleaning machine with adaptors for holding any size disk and cassette for optical disks wherein the disks are rotated while cleaning cloths are radially reciprocated on the top and bottom of the disk simultaneously to remove dirt and other contaminants form the surface of the optical disk. The radial strokes are adjustable to cover the surface of different size disks. The pressure of the cleaning cloths on the surface of the disks is adjustable as is the rate of rotation of the disks during cleaning and the number of revolutions of the disk. The cleaning cloth is spooled on spools held on the cleaning arms and can be advanced as required to maintain a clean portion of the cloth in contact with the disk to be cleaned. An inspection station is included for securing the disk and rotating it while it is examined under a high intensity light by-use of a magnifying glass for cleanliness and for flaws in the disks or damaged disks before returning the optical disks to use. It is important to have clean damage free optical disks for transmitting information. Dirty or damaged disks will not transmit information and will bring down computer systems which are performing valuable work. Preventing down time and providing reliable access to data are ensured by using clean flaw free optical disks.

31 Claims, 3 Drawing Sheets

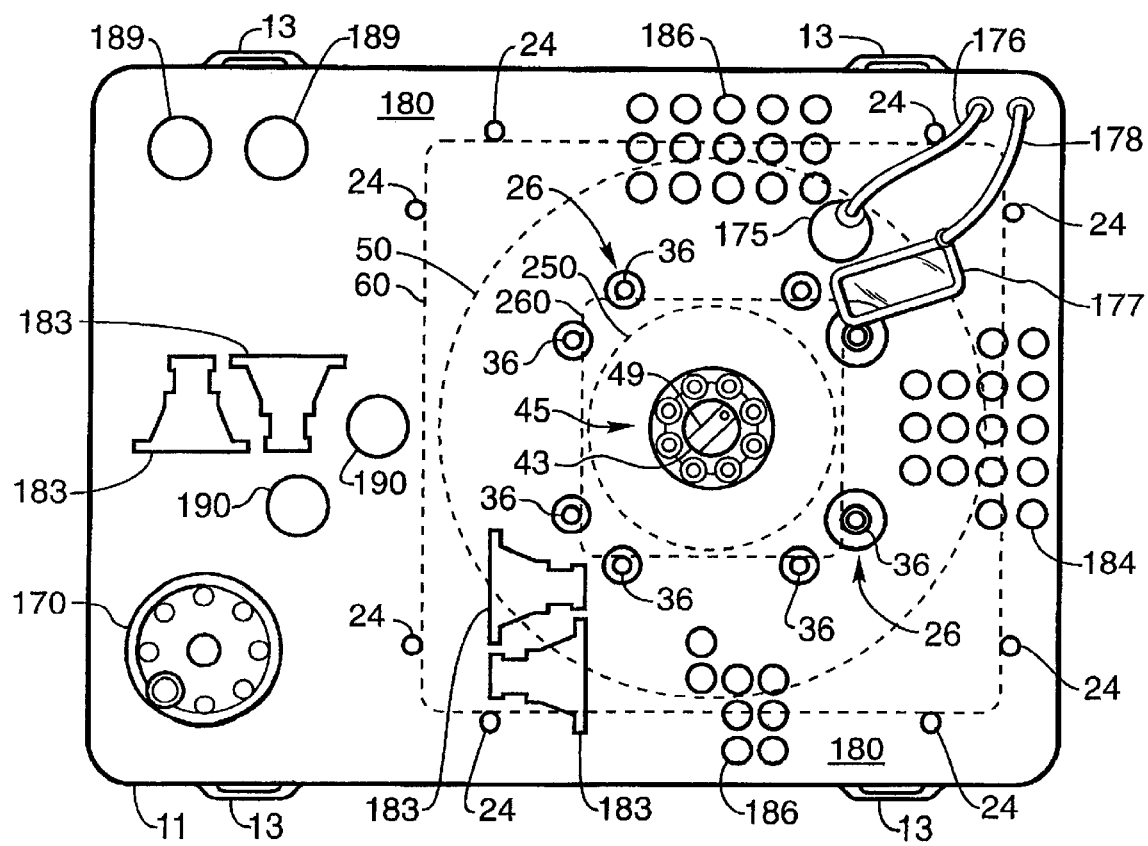
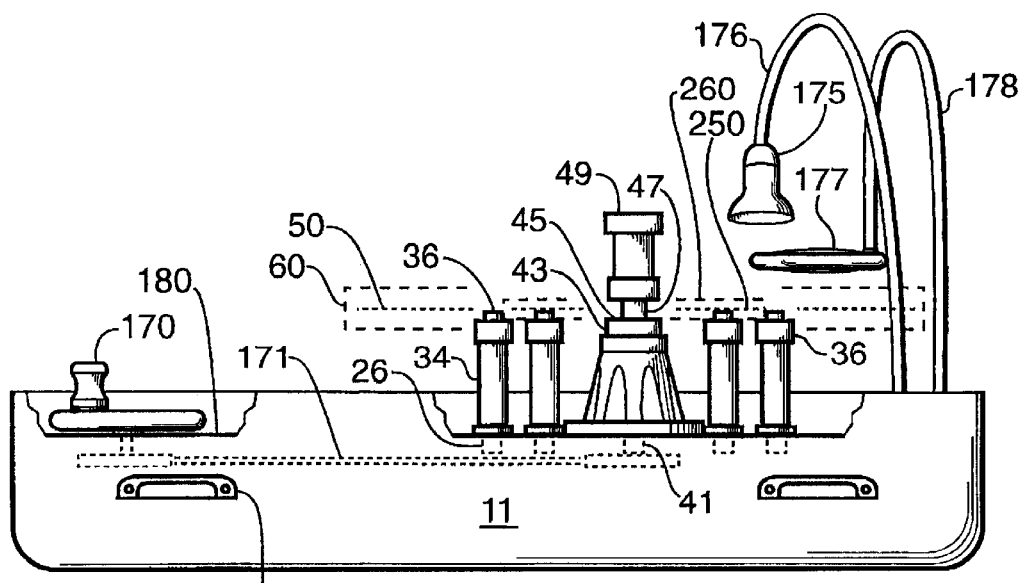
Fig. 3
Fig. 4

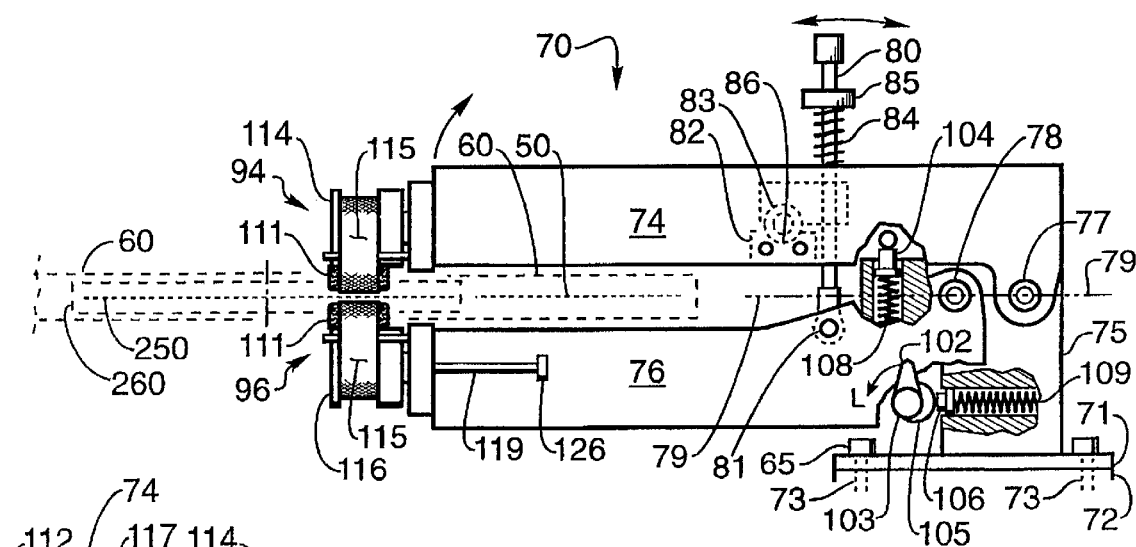
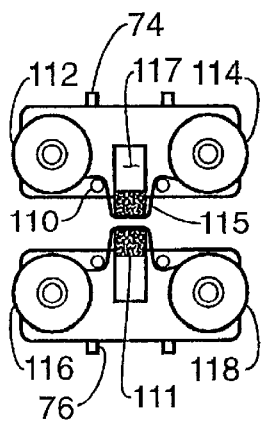
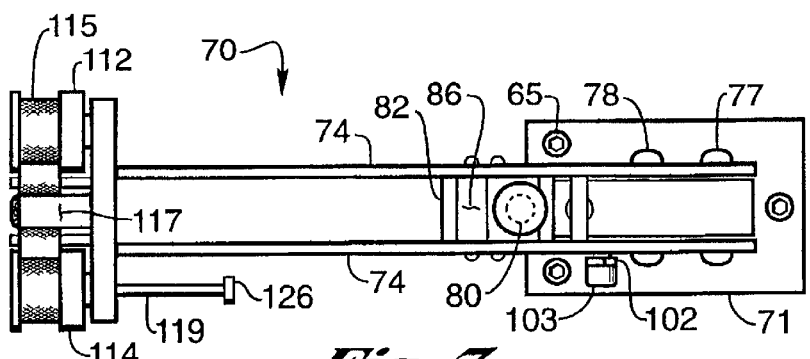
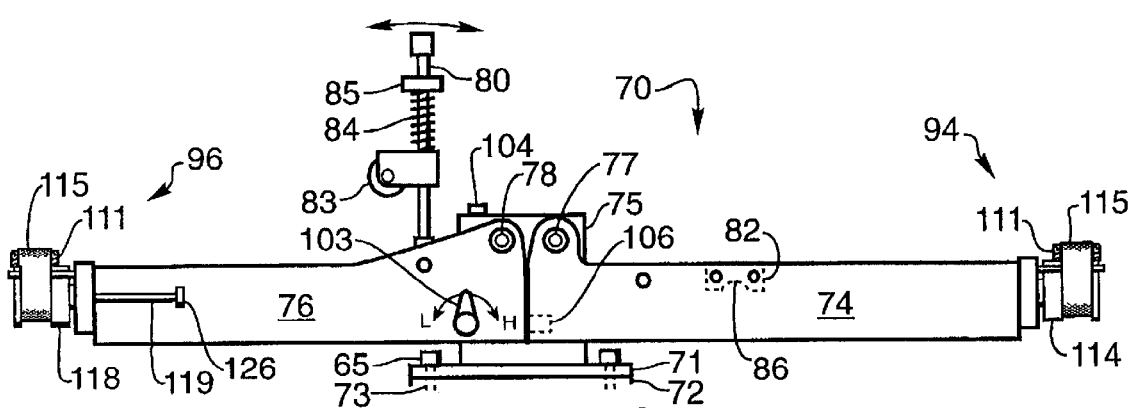

UNIVERSAL OPTICAL DISK AUTOMATED CLEANER-INSPECTOR

BACKGROUND OF THE INVENTION

1. Field of the Invention

This invention relates to cleaning the surfaces of information storage disks and more particularly to cleaning disks in protective disk holding cassettes with a reciprocating motion of the cleaning head moving radially across the disk surface on both sides of the disk simultaneously while the disk rotates about its axis.

2. Description of the Related Art

In the past when disks became dirty they had to be manually cleaned. The protective door of the cassette would be held open and the disk placed on a spindle for rotating the disk to expose the area to be cleaned while a person holding a cleaning cloth rubbed the cloth on the exposed disk surface. This is a tedious job requiring hours of repetitive motion and has many drawbacks. It is slow, it only cleans one side of a disk at a time, there is no uniformity of the pressure on the disk with a hand held cloth, the spaces exposed are not uniformly cleaned, and potential for missing portions of the disk is high since the advancement of the disk to expose the surface to be cleaned is not coordinated with the cleaning strokes applied, the cleaning cloth is easily contaminated by handling the cloth, the cloth is not efficiently used with new portions of clean cloth on the surface of the disk. It takes a long time to clean the disk and the area exposed to cleaning is not uniformly controlled. The wiping motion of the cloth should be uniform and humans tend to get tired and sloppy. Humans need to take breaks and are slow compared to machines. Further humans suffer health risks from repetitive motions.

There are disk cleaning machines for specified sizes and shapes of cassettes and disks but no machines that will universally clean any disk in any cassette.

U.S. Pat. No. 5,467,332 shows a Disc Cleaning device for one size, shape and style of cassette and disk contained therein which cleans one side of the disk at a time by a rotating cylinder of cleaning cloth engaging a rotating disk. The rotating disk is tangential to the grooves or tracks in the disk which is not a preferred method of cleaning. Further the cylinder of cloth is constantly reused tending to get dirtier over time. The pressure of the cloth on the disk is not adjustable.

U.S. Pat. No. 5,963,526 shows a radially reciprocating cleaning device for compact disks which do not have cassette covers. The wiping member is not a cloth that is replaceable and it only cleans one side of the disk at a time. The pressure of the cloth on the disk is not adjustable.

U.S. Pat. No. 5,161,146 shows a disc Cleaning device having a spool of cleaning cloth with a variable tension for contacting the surface of a disk. The cloth can be advanced to expose a clean portion of cloth when needed however the cleaning arm only extends on one side of the disc.

It is desirable to have a universal disk cleaning machine for cleaning any size disk, no matter what cassette it is placed in. The cleaning should be with a radially reciprocating arm to clean radially across the tracks or grooves in the disk. The cleaning should have uniform pressure on the disk and should clean on both sides of the disk at the same time. The cleaning cloth should be advanceable so that clean cloth can be applied to the disks as required. The disk cleaning machine should be easily transportable light weight easy to set up, easy to use, and provide uniform cleaning of surfaces quickly and efficiently.

SUMMARY OF THE INVENTION

The invention relates to a portable disk cleaning machine which can be quickly set up to clean and inspect any size disks in any type of cassette. The device has a plurality of attachments for holding any size disk at the proper height for engaging the cleaning heads of the device on both sides of the disk, for cleaning both sides simultaneously with even pressure on the cleaning cloth to the disk surface. The disk is rotated in combination with reciprocating motion of the cleaning arm to move the cleaning cloth to ensure that every portion of the disk is cleaned uniformly. The cleaning cloth is kept pristine by advancing clean cloth on spools located on the cleaning arm.

The rotation rate of the disk, the reciprocation rate of the cleaning arm, and the pressure of the cleaning cloth on the disk are all adjustable to ensure cleaning of all portions of both sides of the disk with the desired pressure simultaneously.

An inspection station is provided adjacent the cleaning device for inspecting the disks for cleanliness and for flaws such as scratches.

OBJECTS OF THE INVENTION

It is an object of the invention to provide a disk cleaning machine for all sizes of disks contained in any style of disk holding cassette.

It is an object of the invention to increase disk cleaning production rates.

It is an object of the invention to efficiently clean disks.

It is an object of the invention to clean the entire surface of the all disks with uniform quality.

It is an object of the invention to clean the entire surface of the all disks with a uniform pressure of cleaning cloths on the disks.

It is an object of the invention to clean the entire surface of the all disks with a uniform disk turning speed.

It is an object of the invention to clean the disk radially, not circumferentially.

It is an object of the invention to provide cleaning cloth on spools to keep the cloth clean and provide new cloth by advancing the spools when needed to clean a disk.

It is an object of the invention to make efficient use of the cleaning cloth which is very expensive.

It is an object of the invention to eliminate hand contact with the cleaning cloth to prevent contamination.

It is an object of the invention to increase performance of computer systems by having cleaned disks.

It is an object of the invention to provide a top cleaning arm and a bottom cleaning arm with independently adjustable pressures of cloth contact on a disk.

It is an object of the invention to clean both sides of disk at once.

It is an object of the invention to be able to adjust the height of each style of disk to a uniform height to function in conjunction with the cleaning arms.

It is an object of the invention to allow the cleaning arms to float up and down on the surface of the disk to follow disk warps and wobbles with even pressure on the cleaning cloth.

It is an object of the invention to be compact and lightweight such that it is easy to transport the cleaning device as carry-on luggage in airplanes.

It is an object of the invention to provide a durable, easy to set-up, and quickly usable cleaning device that is not sensitive to temperature variations.

It is an object of the invention to provide a disk cleaning device with variable settings for parameters, including disk rotation speed, radial stroke length, radial stroke frequency, length of cleaning time, number of cleaning rotations of the disk, disk height, independent cleaning arm tension and torque tension.

Other objects, advantages and novel features of the present invention will become apparent from the following detailed description of the invention when considered in conjunction with the accompanying drawing.

BRIEF DESCRIPTION OF THE DRAWINGS

FIG. 3 is a top plan view of the inspection station.

FIG. 4 is a side view of the inspection station.

FIG. 5 is a side view of the cleaning arm assembly in the closed position.

FIG. 6 is a front view of the cleaning head and spools

FIG. 7 is a top view of the spools on the top cleaning arm

FIG. 8 is a side view of the cleaning arm assembly in the open position.

DESCRIPTION OF THE PREFERRED EMBODIMENTS

Figure 1:
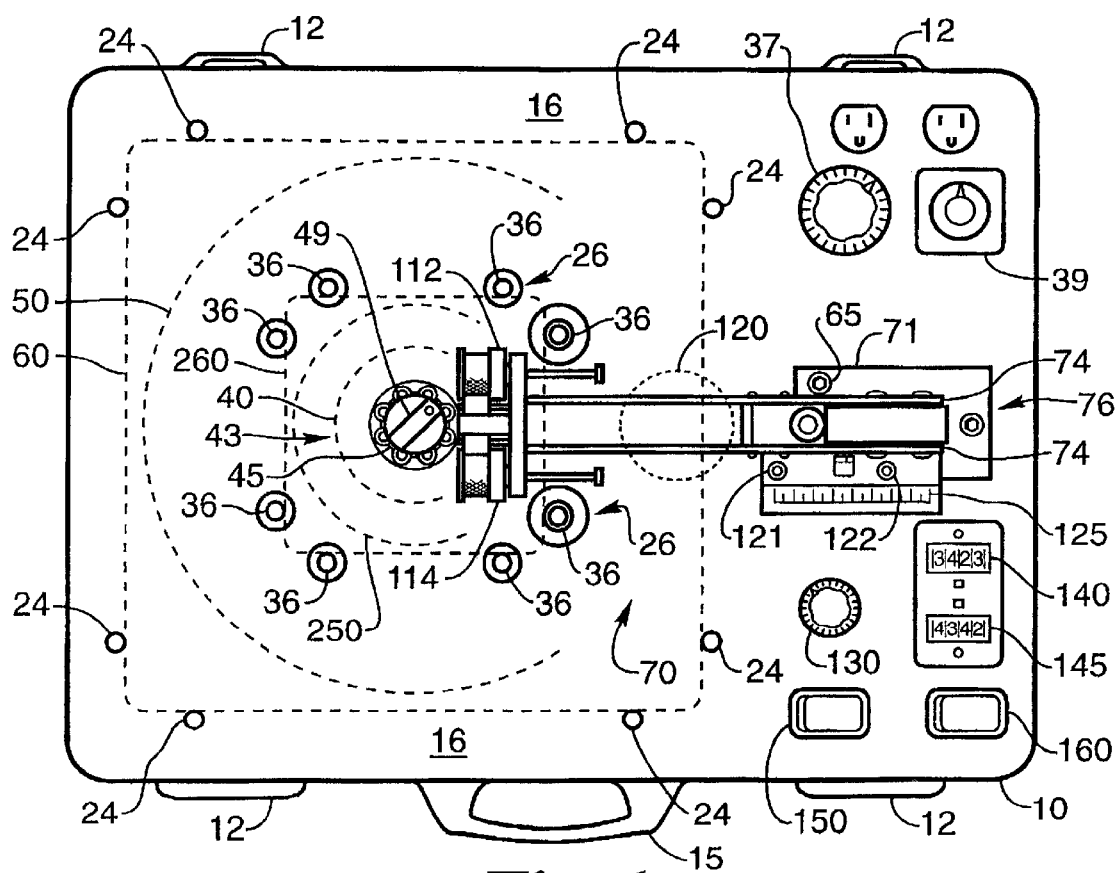
FIG. 1 is a top plan view of the cleaning station.

FIGS. 1–4 show views of a disk cleaning device used for cleaning optical disks held in cassettes. The embodiment shown is for a portable unit which comes in a case having a bottom half 10 and a top half 11. The top half 11 has latches 13 for connecting to latches 12 on the bottom half 10 used for connecting the two halves together. The case also has a handle 15 for carrying the case. The case size is preferably small enough to be carried as carry-on luggage on commercial airline flights so that the disk cleaning equipment is easily transportable between job sites. In conjunction with size restrictions the disk cleaning device is preferably light weight so that it is easily carried, and is well within the airline weight limits for luggage without incurring extra fees.

Figure 2:
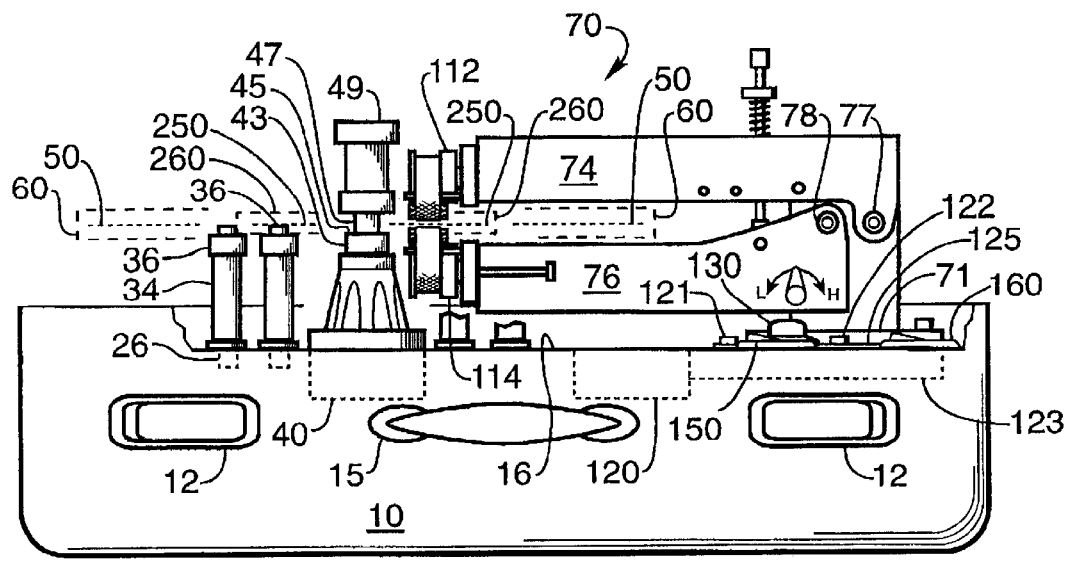
FIG. 2 is a side view of the cleaning station.

When arriving at a job, site the case is opened and the bottom portion of the case 10 is placed as shown in FIG. 2 on a flat surface for use. The bottom portion of the case 10 contains the disk cleaning portion of the invention. As seen in FIG. 1 the bottom portion of the case 10 has a surface plate 16 with a plurality of threaded holes 24 for cassettes 60 containing 12 inch disks 50. The holes 24 are used to screw in disk support posts 34 which support the cassettes 60, having disks 50 to be cleaned. A similar set of threaded holes 26 (see FIG. 2) are used in conjunction with disk support posts 34 for supporting cassettes 260 containing 5¼ inch disks 250.

The number of posts 34 and the position of the posts may be varied depending on the configuration of the cassettes and their sizes. Eight posts 34 are used, two in each corner of the cassettes 60, 260 which are usually rectangular.

Posts 34 may have caps 36 having different heights to adjust the posts 34 to different heights to account for different cassette thicknesses, in order to arrange for a universal height for the disks to be at for being cleaned by the top and bottom cleaning arms 74 and 76, respectively. The caps 36 may have slots or notches therein to conform to different cassette shapes, such as indentations in the cassettes, which will aid in holding the cassettes securely in place. The posts 34 and caps 36 may be color coded or labeled for the type of cassettes to be cleaned to aid in the proper set-up configuration.

Alternatively, the posts 34 can have different caps 36 integral with the posts but for economy of weight and numbers of parts, separate caps 36 are preferred.

Different sizes of spindle center hubs 45 are inserted over the spindle 47 to support different disk cassette sizes with different disk hubs.

The posts 34 provide support for the cassettes 60, 260 at the proper height for the center hub 45 and the cleaning arms 74, 76. The posts 34 also function to prevent the cassettes 60, 260 from spinning on the center hub 45 when the cassettes 60, 260 are placed on the spindle 47.

After putting the posts 34 and caps 36 in place for the type of cassettes to be cleaned the cleaning arm assembly 70 is attached to the plate of reciprocating base 72 with screws 65 which are screwed into threaded holes 73 in base 72, as best seen in FIG. 5.

As shown in FIGS. 5–8 the cleaning arm assembly 70 has a base stand 71 with screw holes 73. The base stand 71 has a column 75 attached at one end for supporting the top cleaning arm 74 and the bottom cleaning arm 76. The top cleaning arm 74 is attached to the column 75 at top cleaning arm pivot point 77. The bottom cleaning arm 76 is attached to the column 75 at bottom cleaning arm pivot point 78. The top cleaning arm pivot point 76 and bottom cleaning arm pivot point 78 are colinear on a line 79 passing through the center of the disk 50 or 250 to be cleaned. Thus both the top and bottom cleaning arms 74 and 76 are equally spaced above and below the disk to be cleaned. The latch rod 80 rotates on pivot 81 to latch or unlatch the top cleaning arm 74. Latch 82 on the inner portion of the top cleaning arm 74 secures latch wheel 83 on latch rod 80 such that the spring 84 on the latch rod 80 urges the latch wheel 83 into the semicircular groove 86 in the latch 82. The spring tension adjusting nut 85 on the latch rod 80 sets the tension on the spring 84 to urge the top cleaning arm 74 and the bottom cleaning arm 76 towards each other such that the cleaning cloth 115 on the top and bottom cleaning arms 74 and 76 are both in contact with the disk 50 or 250 being cleaned.

When the top cleaning arm 74 and the bottom cleaning arm 76 have colinear pivot points 77 and 78 respectively, the top and bottom cleaning arms can move in unison up or down as the disk wobbles due to waviness of the disk surface. The top and bottom cleaning arms 74, 76 may also act independently due to variations in the thickness of the disk 50 as the disk rotates.

When the latch rod 80 is moved to the right, in the figures, the latch 82 is released and the top cleaning arm 74 can be rotated to the right on pivot 77 to release the cassette 60 or 260 from between the cleaning heads 94 and 96. As shown in FIG. 8, the top cleaning arm 74 opens up all the way so that the cleaning heads 94 and 96 are resting in the same plane. The spools 112 and 116 can then be replaced, inspected or advanced with the cleaning surface portion visible. Cleaning fluid can be applied to the cloth on the cleaning heads when the cleaning arms are in this position. The cleaning fluid can be sprayed on or dabbed on to the cleaning cloth 115 before the top cleaning arm 74 is rotated back to its latched position for cleaning disks 50, 250.

The bottom cleaning arm 76 has a button 106 having a spring 109 urging it into spring loaded contact with lower cleaning arm 76. The lower cleaning arm has a tension adjustment 103 comprising a wheel with an offset axis 105 and a lever 102 for adjusting the position of the wheel on the offset axis 105 to increase or decrease tension on the spring

109. Lever 102 thereby adjusts the pressure of the bottom cleaning arm 76 and the cleaning head 96 on the bottom of disk 50 or 250.

Similarly, spring loaded button 104 and spring 108 adjust the pressure of cleaning head 94 on the top of disk 50, 250. In the embodiment shown no adjustment is used on the spring loaded button 104 to adjust the load on the upper cleaning arm 74 and the upper cleaning head 94. The latch rod 80 and its spring 84 and tension adjustment nut 85 effectively adjust the tension of the cleaning head 94 on the top of disk 50, 250.

Before the disk 50, 250 are placed on the spindle for cleaning, the protective doors of the disk cassette 60, 260 are moved to the open position and are held open by blocks placed at the end of the cassette, or in some cassettes by the spindle retention knob 24, thereby preventing the protective doors from closing.

The disks have spindle holes in the center of their hubs. The disk is placed on the spindle 47 and is slid down the spindle until stopped by the center hub 45, which matches the radius of the center hub on the disk 50, 250. The top of the center hub 45 is flat and forms a spindle platform 43, which engages and spins the disks 50, 250.

A spindle retention knob 49, having a portion which engages the center hub 45 on disks 50, 250 is placed on the spindle 47 to hold cassettes 60, 250 between the spindle retention knob 49 and the spindle platform 43. The cassettes 60, 260 are then held steady at their center on the spindle 47 and held steady on the support posts 34 by its edges so that the disks 50, 250 will not move out of a plane its surface is in during cleaning.

There are different sized spindle retention knobs 49 for 5¼ inch disks 250 and 12 inch disks 50 which may vary in characteristics by brand of cassette used.

The disk spindle platform 43 is rotated by spindle motor 40, which is a variable speed DC motor. In one embodiment the motor 40 has a timer for turning it on and off so that it will make a small portion of a turn, for example 1 or 2 degrees and then stop. The DC motor is therefore only runs a small portion of the time, reducing the heat output and allowing the disk to remain stationary during a reciprocating cleaning head stroke radially across the disk surface. It is preferred to clean the disks 50, 250 by a radial cleaning stroke because there will be less residue left in the tracks on the disks which will improve the ability of the disks to be read. The spindle motor on times and rest times are controlled by timers having knob 37 for controlling the on time and knob 39 for controlling the off time.

The cleaning arm assembly 70 is attached to reciprocating base 72, which is connected to an AC motor 120 having a mechanism 123 which reciprocates the reciprocating base 72. The cleaning arm assembly 70 is thereby driven radially across the face of the disk 50, 250.

Stroke length adjustment knobs 121, 122 adjust the length of the stroke of the cleaning heads 94, 96 on the cleaning arm assembly 70. The front adjustment knob 121 adjusts the length of the stroke near the center of the disk 50, 250, and the rear adjustment knob 122 adjusts the stroke near the circumference of the disk 50, 250. Since disk sizes and radius of surfaces needing to be cleaned vary, the stroke of the reciprocal motion of the cleaning heads 94 and 96 vary. Stroke length adjustment knobs 121 and 122 may have limit switches attached to limit the stroke of the reciprocating base 72. A scale 125, adjacent the length adjustment knobs 121 and 122, has marks for adjusting the location of the cleaning head strokes relative to the area of the media contained on the disks 50, 250.

The speed of the motor AC 120 for controlling the reciprocating motion speed is fixed.

The length of the stroke may be controlled by an AC servo motor.

The time that the disk cleaning device is on is controlled by cycle length control knob 130, which controls the amount of time the DC motor 140 is on, and allows 1 or more complete revolutions of the disk 50, 250, such that the entire surface of disk 50, 250 is cleaned at least once. Counter 140 displays the number of starts, via a manual switch, of the spindle motor 40 in the disk turning mode alone. Counter 145 counts the number of automatic cycles of the spindle motor 40 while the cleaning arm assembly 70 is reciprocating. This feature is a means of counting the number of disks 50, 250 cleaned.

When the spindle turning switch 150 is turned on the spindle motor rotates 40 but the cleaning arm assembly 70 remains stationary.

When the automatic cycle button 160 is depressed, the spindle motor 40 turns the disk 50, 250 while cleaning arm assembly 70 moves back and forth, and the timer 130 runs for the time specified for the cleaning of disk 50, 250.

As a safety feature the percent of torque setting on knob 37, is connected to a potentiometer which limits the power delivered to DC motor 40 driving the disk 50, 250 such that in the event of a bind or failure of some kind in the cassette 60, 260 the DC motor 40 will stop turning the disk 50, 250.

FIG. 6 shows a front view of the spools 112 and 114 which are the storage and take-up spools respectively on the top cleaning arm 74, and spools 116 and 118, which are the storage and take-up spools respectively, on the bottom cleaning arm 76. The cleaning cloth 115 runs from storage spools 112 and 116 to a take-up spools 114 and 118 on the top and bottom cleaning arms 74 and 76, respectively.

As an example, the cloth 115 extends between the storage spool 112 and the takeup spool 114 by passing over rollers 110 and over pads 111, which may be foam rubber or other soft material, to press the cloth 115 against the disk 50. The pads 111 are attached to pad frames 117 on the ends of the cleaning arms 74 and 76 to hold an area of cleaning cloth 115 under the tips of the cleaning arms flat so as to be parallel to the surface of the disks 50, 250.

The take-up spool 114 is on the top cleaning arm 76 and is accessible to turn the spool manually by directly engaging the spool and turning it to pull a clean portion of cloth 115 from the storage spool to a position under the pad 111.

The take up spool 118 has axel 119 extending from the spool, which extends out from under the cassette 60, 260 to be cleaned allowing access to turn the spool 118 by rotating knob 126 on axel 119 to obtain a clean portion of cloth 115 under pad 111 on the bottom cleaning arm 76.

After each disk 50, 250 is cleaned the cloth 115 proximate the pads 111 may be viewed and a clean portion of cloth 115 may be positioned on the pads 111. Since the cloth 115 is expensive a controlled use of the cloth saves money. The cloth 115 need not be advanced until inspection reveals it is getting soiled.

The top half of the case 11 is an inspection station having a spindle 47, a spindle platform 43, spindle caps 49, posts 34 and post caps 36 for securing the cassettes 60, 260 for inspection of disks 50, 250 just as on the cleaning half 10 of the case. The inspection spindle platform 43 is rotated by a hand-operated crank 170 connected by a belt or chain 171 to the base of the spindle 41 such that the disk 50, 250 is easily positioned in a place to be inspected and rotated. The case top half 11, preferably has a high intensity light 175 on a flexible cable 176 for shining on the disk 50 to be inspected. The case preferably has a magnifying glass 177 on a flexible cable 178 for observing the condition of the disk 50, 250. The operator will observe the cleanliness of the disks 50, 250 to see if it requires further cleaning and also inspect the surface of the disks for damage such as cracks, scratches, dents or other blemishes which will effect disk performance.

An operator may use time efficiently by inspecting one disk 50, 250 while at the same time cleaning another disk using this apparatus.

All of the parts needed for the various size cassettes 60, 260 can be stored in the apertures in the surface plate 180. For example the caps 36 fit in apertures 186, support posts 34 fit in apertures 184, spindle platforms 43 fit in spindle platform slots 183, and spindle retention knobs 49 fit in apertures 189 and 190.

A brake release may be used for squeezing the cassettes 60, 260 to disengage the brake of the cassette and allowing disks 50, 250 to rotate freely in the cleaning apparatus.

The pivot points 77, 78 on arms 74, 76 respectively allow the arms to move up and down on the disk surface as the disk 50 wobbles due to not being completely flat.

Obviously, many modifications and variations of the present invention are possible in light of the above teachings. It is therefore to be understood that, within the scope of the appended claims, the invention may be practiced otherwise than as specifically described.

What is claimed is:

1. A disk cleaning apparatus comprising:
   a means for rotatably securing a disk in a plane about its axis,
   a means for rotating the disk in the plane,
   a means for radially reciprocating a top cleaning arm and a bottom cleaning arm simultaneously for applying a cleaning cloth to the top and bottom of the disk for cleaning while it is rotating,
   a means for applying an independent force on the cleaning cloth to the top of the disk and an independent force on the cleaning cloth to the bottom of the disk.

2. A disk cleaning apparatus as in claim 1 further comprising:
   a means for advancing a new portion of cloth for cleaning the disk.

3. A disk cleaning apparatus as in claim 1 further comprising:
   a means for independently adjusting the force applied to the cleaning cloth on the top of the disk and the bottom of the disk.

4. A disk cleaning apparatus as in claim 1 further comprising:
   a means for adjusting the radial stroke length of the reciprocating cleaning arms.

5. A disk cleaning apparatus as in claim 1 further comprising:
   a means for adjusting the rotation speed of the disk.

6. A disk cleaning apparatus as in claim 1 wherein:
   the means for rotatably securing a disk in a plane comprises, a spindle having a spindle platform for laying the disk on and a spindle cap for securing the hub of the disk to the spindle without vertical movement and,
   a plurality of posts around the perimeter of a disk cassette to secure the disk cassette and disk surface from tilting out of a fixed plane and from rotation of the cassette.

7. A disk cleaning apparatus as in claim 6 wherein:
   a motor turns the spindle platform to rotate the disk in the cassette.

8. A disk cleaning apparatus as in claim 7 wherein:
   a motor reciprocates the cleaning arms.

9. A disk cleaning apparatus as in claim 8 wherein:
   a top cleaning arm and a bottom cleaning arm have a collinear pivot point with the center of the disk being cleaned.

10. A disk cleaning apparatus as in claim 9 wherein:
    the top and bottom cleaning arms have independent pivot points and independent spring loaded means for applying pressure to the top and bottom disk surfaces to apply even pressure of the cleaning cloth on wobbly disks and disks with variable thicknesses.

11. A disk cleaning apparatus as in claim 9 wherein:
    the top cleaning arm has a storage spool and a take up spool for storage of the cleaning cloth with the cleaning cloth stretched therebetween and a pad under a portion of the cleaning cloth to provide resilient support for cloth on the surface of the disk.

12. A disk cleaning apparatus as in claim 1 further comprising:
    a means for inspecting the disks for flaws and cleanliness.

13. A disk cleaning apparatus as in claim 12 wherein:
    the disk cleaning apparatus is contained in a case having a top half and a bottom half, one half containing the disk cleaning apparatus and the other half containing the disk inspection apparatus.

14. A disk cleaning apparatus as in claim 13 wherein:
    the case has apertures for storing all parts used in the disk cleaning apparatus.

15. A disk cleaning apparatus comprising:
    a means for rotatably securing a disk in a plane about its axis,
    a means for rotating the disk in the plane,
    a means for radially reciprocating a top cleaning arm and a bottom cleaning arm simultaneously for applying a cleaning cloth to the top and bottom of the disk for cleaning while it is rotating,
    a means for adjusting the radial stroke length of the reciprocating cleaning arms.

16. A disk cleaning apparatus as in claim 15 further comprising:
    a means for adjusting the rotation speed of the disk.

17. A disk cleaning apparatus as in claim 15 wherein:
    the means for rotatably securing a disk in a plane comprises, a spindle having a spindle platform for laying the disk on and a spindle cap for securing the hub of the disk to the spindle without vertical movement and,
    a plurality of posts around the perimeter of a disk cassette to secure the disk cassette and disk surface from tilting out of a fixed plane and from rotation of the cassette.

18. A disk cleaning apparatus as in claim 17 wherein:
    a motor turns the spindle platform to rotate the disk in the cassette.

19. A disk cleaning apparatus as in claim 18 wherein:
    a motor reciprocates the cleaning arms.

20. A disk cleaning apparatus as in claim 19 wherein:
    a top cleaning arm and a bottom cleaning arm have a colinear pivot point with the center of the disk being cleaned.

21. A disk cleaning apparatus as in claim 20 wherein:

the top and bottom cleaning arms have independent pivot points and independent spring loaded means for applying pressure to the top and bottom disk surfaces to apply even pressure of the cleaning cloth on wobbly disks and disks with variable thicknesses.

22. A disk cleaning apparatus as in claim 20 wherein:

the top cleaning arm has a storage spool and a take up spool for storage of the cleaning cloth with the cleaning cloth stretched therebetween and a pad under a portion of the cleaning cloth to provide resilient support for cloth on the surface of the disk.

23. A disk cleaning apparatus as in claim 15 further comprising:

a means for inspecting the disks for flaws and cleanliness.

24. A disk cleaning apparatus as in claim 23 wherein:

the disk cleaning apparatus is contained in a case having a top half and a bottom half, one half containing the disk cleaning apparatus and the other half containing the disk inspection apparatus.

25. A disk cleaning apparatus as in claim 24 wherein:

the case has apertures for storing all parts used in the disk cleaning apparatus.

26. A disk cleaning apparatus comprising:

a means for rotatably securing a disk in a plane about its axis, a means for rotating the disk in the plane, a means for radially reciprocating a top cleaning arm and a bottom cleaning arm simultaneously for applying a cleaning cloth to the top and bottom of the disk for cleaning while it is rotating, the means for rotatably securing a disk in a plane comprises, a spindle having a spindle platform for laying the disk on and a spindle cap for securing the hub of the disk to the spindle without vertical movement and, a plurality of posts around the perimeter of a disk cassette to secure the disk cassette and disk surface from tilting out of a fixed plane and from rotation of the cassette, a motor turns the spindle platform to rotate the disk in the cassette, a motor reciprocates the cleaning arms, a top cleaning arm and a bottom cleaning arm have a collinear pivot point with the center of the disk being cleaned.

27. A disk cleaning apparatus as in claim 26 wherein:

the top and bottom cleaning arms have independent pivot points and independent spring loaded means for applying pressure to the top and bottom disk surfaces to apply even pressure of the cleaning cloth on wobbly disks and disks with variable thicknesses.

28. A disk cleaning apparatus as in claim 26 further comprising:

a means for inspecting the disks for flaws and cleanliness.

29. A disk cleaning apparatus as in claim 28 wherein:

the disk cleaning apparatus is contained in a case having a top half and a bottom half, one half containing the disk cleaning apparatus and the other half containing the disk inspection apparatus.

30. A disk cleaning apparatus as in claim 29 wherein:

the case has apertures for storing all parts used in the disk cleaning apparatus.

31. A disk cleaning apparatus as in claim 26 wherein:

the top cleaning arm has a storage spool and a take up spool for storage of the cleaning cloth with the cleaning cloth stretched therebetween and a pad under a portion of the cleaning cloth to provide resilient support for cloth on the surface of the disk.

* * * * *